(12) United States Patent
Abou Arbid

(10) Patent No.: US 10,519,291 B2
(45) Date of Patent: Dec. 31, 2019

(54) MATERIAL AND METHOD FOR AN ARTIFICIAL ROCK

(71) Applicant: Silia Abou Arbid, Oakville (CA)

(72) Inventor: Silia Abou Arbid, Oakville (CA)

( * ) Notice: Subject to any disclaimer, the term of this patent is extended or adjusted under 35 U.S.C. 154(b) by 442 days.

(21) Appl. No.: 15/259,419

(22) Filed: Sep. 8, 2016

(65) Prior Publication Data

US 2017/0066283 A1   Mar. 9, 2017

Related U.S. Application Data

(60) Provisional application No. 62/215,351, filed on Sep. 8, 2015.

(51) Int. Cl.
| | |
|---|---|
| C08J 9/42 | (2006.01) |
| B29C 43/18 | (2006.01) |
| B29C 43/56 | (2006.01) |
| B29B 13/10 | (2006.01) |
| B29K 63/00 | (2006.01) |
| B29K 75/00 | (2006.01) |
| B29K 105/04 | (2006.01) |
| B29K 105/26 | (2006.01) |

(52) U.S. Cl.
CPC ............. *C08J 9/42* (2013.01); *B29B 13/10* (2013.01); *B29C 43/18* (2013.01); *B29C 43/56* (2013.01); *B29C 2043/188* (2013.01); *B29C 2043/561* (2013.01); *B29K 2063/00* (2013.01); *B29K 2075/00* (2013.01); *B29K 2105/045* (2013.01); *B29K 2105/26* (2013.01); *C08J 2205/05* (2013.01); *C08J 2367/00* (2013.01); *C08J 2375/04* (2013.01); *C08J 2433/06* (2013.01); *C08J 2463/00* (2013.01); *C08J 2467/00* (2013.01)

(58) Field of Classification Search
CPC . C08J 9/42; B29B 13/10; B29C 43/18; B29C 43/56; B29C 39/021; C04B 26/06; C04B 26/14; C04B 26/18; B44C 5/06
See application file for complete search history.

(56) References Cited

U.S. PATENT DOCUMENTS

| | | | |
|---|---|---|---|
| 4,385,088 A | * | 5/1983 | Baskin .................. B44C 5/06 206/518 |
| 4,847,026 A | | 7/1989 | Jarboe et al. |
| 4,940,558 A | | 7/1990 | Jarboe et al. |
| 4,960,622 A | | 10/1990 | Jarboe et al. |

(Continued)

FOREIGN PATENT DOCUMENTS

DE            4306626        *  9/1994

*Primary Examiner* — Stella K Yi
(74) *Attorney, Agent, or Firm* — John Maldjian; Maldjian Law Group LLC

(57) ABSTRACT

The invention relates to modifying synthetic fiber sponge, such as polyester or polyurethane foam, with an epoxy-, polyester, or acrylic-resin to induce an engineered rock product for use as stone replacement in a variety of applications. The method for manufacturing comprises: producing a foam block; shaping the foam block into any regular or irregular shape; weathering the shaped foam block; infusing the weathered foam block with a resin; curing the infused foam block; and finishing the cured foam block. The artificial rock comprises a foam block shaped to resemble a rock, an exterior of the foam block infused with a resin.

16 Claims, 1 Drawing Sheet

(56) References Cited

U.S. PATENT DOCUMENTS

| | | | |
|---|---|---|---|
| 5,543,185 A * | 8/1996 | Christensen | A63B 69/0048 |
| | | | 156/61 |
| 5,679,189 A | 10/1997 | Jarboe | |
| 2013/0276406 A1 * | 10/2013 | Coate | C04B 28/02 |
| | | | 52/745.21 |

* cited by examiner

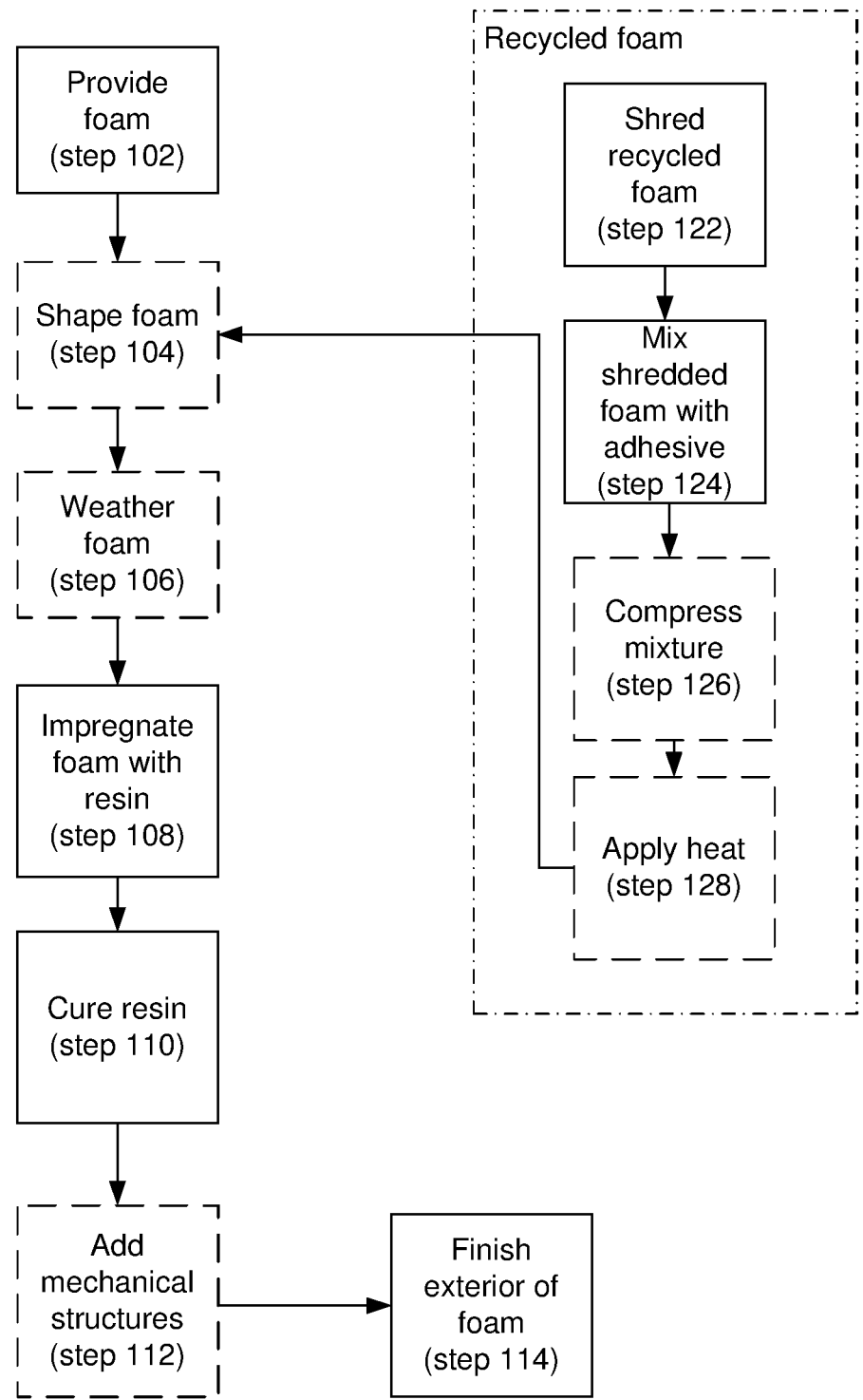

MATERIAL AND METHOD FOR AN ARTIFICIAL ROCK

CROSS-REFERENCE

This application claims priority to, and the benefit of, U.S. Provisional Application No. 62/215,351, filed Sep. 8, 2015 the content of which is herein incorporated by reference.

FIELD OF THE INVENTION

The present invention relates generally to a material and method for an artificial rock or similar decorative form which has a natural rock-like texture. More specifically, the present invention relates to an artificial rock product employing a foam carrier impregnated with a resin polymer, and to a method of producing such artificial rock product.

BACKGROUND OF THE INVENTION

U.S. Pat. No. 4,385,088 to Baskin, herein incorporated by reference, discloses an artificial decorative rock of foamed synthetic plastic having a body with an outer surface resembling the concavities and convexities of a natural rock. The outer surface is coated with a strengthening layer of epoxy resin filled with hard sand-like particles which give the outer surface a rock simulating, grained texture. The process involves sculpting a solid, rectangular block of expanded polystyrene into a form resembling a roughly shaped or contoured rock using simple cutting and scraping hand tools, such as knives, scrapers, or heated tools. A hollow is formed inside the rock-like exterior. A liquid epoxy resin, hard particles and preferably dark brown, grey and other rock-like pigments are sprayed on the sculptured form in order to strengthen it and aid in the appearance of a natural stone.

U.S. Pat. No. 5,543,185 to Arete Climbing Systems, Inc., herein incorporated by reference, describes a climbing structure based on the use of polystyrene foam blocks attached to a support structure. The polystyrene is cut to be irregularly shaped like a natural rock giving a more realistic structure. The shaped polystyrene foam is covered with one or more hard coating of a cement-like material applied to the foam to give it strength and to give it a rock-like appearance. The cement-like material consists of a mixture of synthetic fiber strands, acrylic liquid plastic, cement (or plaster), and water. The cement-like material is sprayed on using a hopper or plastering gun and smoothed out using sponges and water. The structure is then buffed to give a final textured structure.

U.S. Pat. Nos. 4,847,026; 4,940,558; 4,960,622; 5,543,185; and U.S. Pat. No. 5,679,189 to Futura Coatings, all of which are herein incorporated by reference, teach a method for producing simulated rocks (or trees) by spraying a high density polyurethane elastomer in a flexible mold. The flexible mold is created by cleaning a native rock with soap and water and then uniformly brushing latex rubber on the exterior. The latex is then reinforced using a fabric and a cradle is produced by spraying the exterior of the mold with two to three pound density polyurethane foam at a thickness of three to four inches. After the preparation of the cradle, the cradle and mold are demolded from the rock model and allowed to cure. During artificial rock manufacture, urethane spraying of the interior of the cradle and mold is carried out employing heated plural component equipment for delivering an isocyanate side and polyol side to the spray gun in an exact ratio.

It is an object of this invention to at least provide a process of modifying environmentally-friendly polymer foams to make them harden and seem like stone in appearance and strength for either artisanal or industrial purposes. The process of hardening the open-cell or closed-cell e-polymer foams with a resin, while in the making, can include the addition of certain chemicals, gases and applied heat and pressure factors that allows the material to reach heightened properties of mechanical performance, insulation capacities and durability, thus acquiring the physical characteristics of natural rock, whilst being in counterpoint lightweight and offering accrued versatility in production techniques, usage applications and handling by the end user.

SUMMARY OF THE INVENTION

According to one aspect of the invention, there is provided a method for manufacturing an artificial rock comprising: providing a foam block; impregnating the foam block with resin which is in a viscous to liquid form, by infusing the resin into the foam block; curing the impregnated foam block; and finishing the cured foam block.

According to any aspect of the invention, the method may further comprise shredding recycled foam, and mixing the shredded foam with an adhesive.

According to any aspect of the invention, the method may further comprise at least one of: compressing the shredded foam and adhesive mixture, and applying heat to the shredded foam and adhesive mixture.

According to any aspect of the invention, the method may further comprise shaping the foam block into any regular or irregular shape, prior to the impregnating.

According to any aspect of the invention, the method may further comprise weathering the foam block prior to the impregnating. The weathering may comprise exposing the foam block to at least one of: open air, direct sun rays, and rain, for a prolonged period of time. The weathering may also comprise using at least one of: ultraviolet light, heat, cold, wind erosion, and water erosion.

According to any aspect of the invention, the impregnating maybe done under at least one of: ambient temperature and pressure, vacuum, and temperature control.

According to any aspect of the invention, the impregnating may comprise infusing the resin into the foam block using at least one of: soaking, dabbing, spraying, application with a brush, application with a roller, injection, and vacuum.

According to any aspect of the invention, the impregnating may comprise pouring batches of the resin onto a plurality of faces of the foam block, one face at a time, the pouring being made in successive superposed layers. The impregnating may further comprise applying simultaneous sweeping and dabbing actions for allowing the resin to infuse into deeper layers of a surface of the foam block by capillarity action.

According to any aspect of the invention, the impregnating may comprise spraying resin onto an exterior of the foam block, then dabbing the foam block with an applicator to ensure a matt finish.

According to any aspect of the invention, the impregnating may comprise generating vacuum in at least one of: a center of the foam block, and a bottom of the foam block, and then infusing the resin into the foam block.

According to any aspect of the invention, the impregnating may be done at varying depths.

According to any aspect of the invention, the impregnating may comprise compressing the foam block to reduce internal voids, increase density, and control finishing of the artificial rock.

According to any aspect of the invention, the foam is either polyester or polyurethane.

According to any aspect of the invention, the resin is selected from the group consisting of: epoxy, polyester, and acrylic.

According to any aspect of the invention, the method further comprises varying at least one of: temperature, pressure, compression, decompression, subduction, and convection, to modify at least one of: morphological aspects, structural strengths, porosity, density, insulation, and durability properties of said foam block.

According to another aspect of the invention, there is provided an artificial rock comprising an open-cell foam carrier material or substrate, the foam material being partially, variably or substantially impregnated with an infused resin of polymeric origin in a liquid form; the infused resin being cured into a solid material to produce a highly-durable composite structure wherein the resin coats a skeleton of said carrier material, and fills voids formed within said foam material.

BRIEF DESCRIPTION OF THE DRAWINGS

Embodiments of the present invention will now be described, by way of example only, with reference to the attached FIGURE, wherein:

FIG. 1 shows a flow chart for a process to produce an artificial rock from a foam.

DETAILED DESCRIPTION OF THE EMBODIMENTS

The present invention provides, in part, a new and useful artificial rock material that can be modeled to simulate any rock formation type. The artificial rock material may be designed and engineered as a re-enforced building material to accommodate all sorts of free forms and open sizes. The artificial rock material may be prefabricated as a structural material with a wide range of intrinsic structural properties and complementary rigidifying mechanisms and accessories. In all its forms, the artificial rock material may be utilized as a cladding material or as a sound attenuation and heat insulation material, or even as a hybrid-use material, depending on its manufacturing process as set forth herein. The artificial rock material can be intended for internal and/or external usages of all types, in architecture, interior design, landscaping, as well as furniture, products, sculpture, jewelry and accessories.

In accordance with an embodiment of the present invention, a process for producing an artificial rock from a foam is shown in FIG. 1. The process comprises providing a foam block injected into a mold (step 102). In one embodiment, the foam block may be formed by mixing a di- or polyisocyanate with a polyol as is known in the art. In other embodiments the material of the foam block can be natural (such as animal or plant fiber), cellulose wood fibers, or any artificial polymer-based foam such as polyurethane, polyester, polyvinyl alcohol (PVA) manufactured and processed to provide a lightweight foam material with suitable densities, permeability, network interconnectivity, water and liquid absorbency, and mechanical and physical properties. The material of the foam block may also be reconstituted foam, recycled foam, layered foam, laminated foam with fibrous or textile interlamina or any combination of the above materials. In yet another embodiment, the foam may be prefabricated and provided to the process in ready-made form.

In accordance with one embodiment, once the foam is set, the outermost surface layers are hand-modeled (i.e. sculpted) cold by hand and handheld power tools, such as a hacksaw blade, a cutter, and a metal brush modified to create an artificial rock block to the desired shape (step 104). In an alternate embodiment, foam blocks may be pre-cut to desired shape and size, and provided to the process as part of step 102.

In accordance with one embodiment, the foam block is left to weather (artificially or naturally) for approximately three months, uncovered and exposed to daylight and dust (step 106). The natural weathering of the sculpted foam comprises exposing it to: open air, direct sun rays, or extreme rain, for prolonged periods of time, such as several months or a few years. Weathering the foam block prior to applying the resin, provokes natural surface deterioration and allows for unforeseen visual outputs, such as natural surface erosion, and color de-tinting into smoky patina in particular areas. New foam cuts, however, may enable a perfect smooth finish if desired. In an alternate embodiment, foam blocks may be provided to the process in pre-weathered condition.

A resin is applied to the foam block (step 108). The resin applied may be any resinous viscous to liquid material. Resins used may be natural (plant) or synthetic resins such as epoxy, polyester, acrylic/polymethyl-methacrylate, or any type of polymeric resin/plastic that can be applied in a viscous to liquid form at ambient temperature and pressure, or under vacuum and temperature control, to impregnate the foam. The resin may contain various amounts of fillers, particles, aggregates, fibers, inclusions, to vary the properties of the final product. The resin may be applied manually by soaking, dabbing, spraying, using a brush or a roller, or any other suitable application method known in the art. The resin may be applied by semi-automated or automated mechanical tools, or by injection or vacuum to impregnate the foam. The resin is selected for a variable curing time depending on the method of application and the desired effect. In one embodiment, batches of resin are poured onto one face (of the foam block) at a time, in several successive superposed layers, and are quickly spread evenly with an applicator such as a paint brush, a sponge, etc, by applying a simultaneous sweeping and dabbing action. This allows the resin liquid mixture to impregnate, by capillarity action, the deeper layers of the surface of the foam block, and provides a deep coating for enhanced surface and edge resistance to breakage. In another embodiment, the resin may be sprayed onto the exterior of the foam block and later dabbed with the applicator to ensure a matt finish. In yet another embodiment, a vacuum is generated at the center, or alternatively the bottom, of the shaped foam block and the resin is infused into the foam block. The resin is applied under vacuum for an amount of time dependent upon the size of the shaped foam block. Larger shaped foam blocks require additional time to infuse a sufficient amount of the resin therein, in order for the resultant rock to have structural stability. On a large surface, the application of resin may be done by sections to ensure an even curing on a single section such as the side of the foam block, or along a cut line. At all times, the resin coating should be quickly infused into the foam block for absorption, without allowing it to cure, otherwise, once cured, the surface of the foam block will not allow further absorption of any resin. Each surface of the foam block should be treated progressively, with one side treated after another side has cured. Astute topical dabbing pressure action applied with a an applicator to the surface ensures the formation of sheer matt surface texture while leaving an imperceptible film of resin as top coat entrapped in the aggregates on the foam block surface.

In some embodiment, the impregnation of the foam block can be variable going up to 100% of the available volume, with the possibility of varying the density of the inside and outside portions of the final product. Varying the depth of impregnation as well as varying the filling and sealing of the surfaces, may vary the properties, shape, and density of the final artificial rock product. In addition, the foam block may be compressed during the impregnation process to reduce internal voids, increase density and control finishing. The impregnation of the foam can be done in stages, with each stage varying one or more of: the nature of the resin, the process of applying the resin, the fillers used, and the colors selected.

The next step in the process is to cure the resin (step 110). Curing can be performed at an ambient temperature and pressure, or through the application of one or more of: heat, pressure, and humidity; by autoclaving; or by any other suitable method. During curing, the resin supply is disabled and the vacuum suction is decreased. A small amount of suction from the vacuum is applied during curing to ensure a matt finish on the exterior of the foam block. This vacuum also allows the amount of resin to gradually decrease towards the center of the foam block. During the curing of the resin, exothermic heat released modifies the foam to produce a natural magma vesiculation texture of certain rocks. Curing causes desired hardening of the foam block to produce the desired artificial rock product.

In some embodiments, the foam block may be further reinforced with rods, bars, plates, beams, or other suitable materials to enhance the mechanical properties of the foam block (step 112).

After the resin cures, the surface of the hardened artificial rock product is finished (step 114) to a different texture, roughness, or other properties. Finishing may be done using mechanical or hand tools, natural and accelerated weathering processes, exposure to radiation, heating, and the application of chemical modifiers to produce desired simili-rock effects. In some embodiments the finishing steps may be applied during the manufacturing process. In other embodiments the finishing is performed after the hardening. In some embodiments, the final product is hand-altered or finished with high-friction power tools such as a grinder and sander, to wear the hardened foam block like natural rock. During this phase, sanding dust accumulates in the deep striations and micropores of the surface of the hardened foam block, thus intensifying the visual aspect of natural silicification.

In another embodiment, foam intended for recycling, or foam scraps from, for example, foam mattress manufacture, may be shredded into uniform or variable sizes (step 122), and mixed with an adhesive (step 124). The resulting mixture may be compressed (step 126). Heat may be applied to further assist sealing the foam scraps together (step 128). The application of heat may utilize steam, or any other suitable means. The adhesive, used in step 126, may be an ultraviolet (UV) light activated glue that cures under a UV light. The irregular nature of the adhesive and foam scrap sizes produces a composite rock pattern that is similar to a ferrous oxidization effect in natural rocks. The bonded foam scraps may be shaped (step 104) as described earlier. In one embodiment, reclaimed re-bonded foam blocks are glued together and artificially weathered for a time period equivalent to 10 years using UV light, wind tunnels, etc. (step 106). The foam blocks may undergo color transformation from grey with white foam re-bonded particles to a series of rusty grays, yellows, vivid oranges and reds. In addition, the discoloration of the adhesive bonding the contact faces, from light turbid yellow to red may take place. An irregular topography of the surface may be achieved, at the planes of intersection, when the re-bonded blocks are peeled apart. Resin is then infused as previously described (step 108), cured (step 110), and the exterior surface finished (step 114).

In yet another embodiment, the foam block may comprise multiple-ply laminated foam sheets or slabs (recycled or otherwise), where the layers of foam are set in strata that are successively treated with resin, to form laminated plies resembling a sedimentary rock, that are in turn compressed with high pressure and cured with heat to make a hardcore, durable material topped with a decorative face or face-and-back layers that can be either prefabricated or hand modeled by the end user, according to the desired form and finish aspects.

In any of the examples, the foam may be treated during manufacture to improve one or more of: flame resistance, UV resistance, resistance to decay or abrasion, waterproofing, and thermal and acoustic insulation capabilities.

In some embodiments, the foam composition may be adjusted to vary the weight from low density foams having a density of approximately 6 $kg/m^3$ to microcellular foams of 800 $kg/m^3$ and have a stiffness of flexible to semi-rigid.

Although the examples described herein are directed to hand modeling of the foam, the inventor contemplates that other methods of forming the foam blocks are possible. For example, the foam blocks may be modeled and textured by machine cutting, mold casting, or 3D printing, or any combination of all these processes together.

The inventor also contemplates that the foam block may be cast (in step 102) with additive particles of sand, colored grouts, metal powders, metal filings, wood chips, natural or synthetic fibers, recycled plastic shards, pulp and fleeces to produce varying visual outputs such as filamentation, oxidization, porosity or flamed surface finishes.

The inventor contemplates that resins of various colors, tints, values, and shades, in monochromatic or polychromatic variations may be used to impregnate the foam, depending on the type of artificial rock desired. The inventor also contemplates silkscreen printing of various textures and patterns on the artificial rock surface. The inventor also contemplates using different color dyes during the manufacture of the foam to produce the desired type of artificial rock.

The examples described herein are directed towards a process for making foam appear to be an artificial rock of a particular type. Examples of such rock type may be, for example, igneous, sedimentary, and/or metamorphic rocks and may feature all variations of rock pigmentation and stratification such as, for example, marbled, banded, striated, and/or porphyritic. Examples of igneous rocks may comprise andesite, alkali feldspar granite, anorthosite, aplite, basalt, adakite, hawaiite, basanite, boninite, carbonatite, charnockite, enderbite, dacite, diabase or dolerite, diorite, dunite, essexite, foidolite, gabbro, granite, granodiorite, granophyres, harzburgite, hornblendite, hyaloclastite, icelandite, ignimbrite, ijolite, kimberlite, komatiite, lamproite, lamprophyre, latite, lherzolite, monzogranite, monzonite, nepheline syenite, nephelinite, norite, obsidian, pegmatite, peridotite, phonolite, picrite, porphyry, pumice, pyroxenite, quartz diorite, quartz monzonite, rhyodacite, rhyolite, comendite, pantellerite, scoria, soviet, syenite, tachylyte, tephrite, tonalite, trachyandesite, benmoreite, basaltic trachyandesite, mugearite, shoshonite, trachyte, troctolite, trondhjemite, tuff, websterite, or wehrlite. Examples of sedimentary rocks may comprise argillite, arkose, banded iron formation, breccias, chalk, chert, claystone, coal, conglomerate, coquina, diamictite, diatomite, dolomite or dolostone, evaporate, flint, greywacke, gritstone, itacolumite, jaspillite, laterite, lignite, limestone, marl, mudstone, oil shale, oolite, sandstone, shale, siltstone, travertine, turbidite, or wackestone. Examples of metamorphic rocks may comprise anthracite, amphibolites, blueschist, cataclasite, eclogite, gneiss, gossan, granulite, greenschist, greenstone, hornfels, marble, migmatite, mylonite, metapelite, phyllite, metapsammite, pseudotachylite, quartzite, schist, serpentinite, skarn, slate, suevite, talc carbonate, soapstone, or whiteschist. Alternatively, the foam may be formed to simulate cast concrete composites with smooth surface finish; or cast concrete composites with rough graveled surface finish, displaying fine or coarse artificial aggregates.

Synthetic foam sponge can be fabricated using the method described herein with desired properties, including but not limited to feel, look, and performance. Reaching any desired rock formation may depend on the polymer's constituent components and the processes of production. During production, the inventor contemplates that at least varying temperature, pressure, compression, decompression, subduction, and convection criteria may arrive at different desired properties. The shape of the artificial rock may also depend on how it is cast, and the various processes of enhancement applied to achieve varying morphological aspects and different structural strengths, porosity, density, insulation and durability. Similar to how magma transformed to rock when cooling, synthetic foam sponge is formed of two or more exothermic fluids, that very quickly turn to a molten mixture to which one can incorporate aggregates, before it cures into a dry block formation or crust.

A number of implementations have been described. Nevertheless, it will be understood that various modifications may be made without departing from the spirit and scope of the invention.

The above-described embodiments are intended to be examples of the present invention and alterations and modifications may be effected thereto, by those of skill in the art, without departing from the scope of the invention, which is defined solely by the claims appended hereto.

What is claimed is:

1. A method for manufacturing an artificial rock comprising:
   providing an open-cell polyurethane foam block;
   impregnating said foam block with a resin which is in a viscous to liquid form, by infusing said resin into said open-cell polyurethane foam block;
   curing said impregnated open-cell polyurethane foam block; and
   finishing said cured open-cell polyurethane foam block; wherein said infusing comprises:
   pouring batches of said resin onto a plurality of faces of said open-cell polyurethane foam block; and
   applying simultaneous sweeping and dabbing actions such that said resin infuses into deeper layers of said open-cell polyurethane foam block by capillarity action.

2. The method of claim 1, wherein providing said open-cell polyurethane foam block comprises: shredding recycled open-cell polyurethane foam, and mixing said shredded recycled open-cell polyurethane foam with an adhesive.

3. The method of claim 2, further comprising at least one of: compressing said shredded recycled open-cell polyurethane foam and adhesive mixture, and applying heat to said shredded recycled open-cell polyurethane foam and adhesive mixture.

4. The method of claim 1, further comprising shaping said open-cell polyurethane foam block into any regular or irregular shape, prior to said impregnating.

5. The method of claim 1, further comprising weathering said open-cell polyurethane foam block prior to said impregnating.

6. The method of claim 5, wherein said weathering comprises exposing said open-cell polyurethane foam block to at least one of: open air, direct sun rays, and rain, for a prolonged period of time.

7. The method according to claim 5, wherein said weathering involves the use of at least one of ultraviolet light, heat, cold, wind erosion, and water erosion.

8. The method of claim 1, wherein said impregnating is done under at least one of: ambient temperature and pressure, vacuum, and temperature control.

9. The method of claim 1, wherein said pouring is made in successive superposed layers.

10. The method of claim 1, wherein said impregnating is done at varying depths.

11. The method of claim 1, wherein said impregnating further comprises compressing said open-cell polyurethane foam block to reduce internal voids, increase density and control finishing of said artificial rock.

12. The method of claim 1, further comprising at least one of: placing mechanical structures within, and mixing additive particles with the open-cell polyurethane foam block.

13. The method of claim 1, wherein said resin is selected from the group consisting of: epoxy, polyester, and acrylic.

14. The method of claim 1, further comprising varying at least one of: temperature, pressure, compression, decompression, subduction, and convection to modify at least one of: morphological aspects, structural strengths, porosity, density, insulation, and durability properties of said open-cell polyurethane foam block.

15. The method of claim 1, further comprising applying at least one chemical modifier to the open-cell polyurethane foam block for producing a simili-rock effect.

16. The method of claim 1, further comprising finishing the artificial rock with a least one high friction power tool for causing dust to accumulate in a plurality of striations and micropores of the open-cell polyurethane foam block.

* * * * *